United States Patent [19]

Renzel et al.

[11] 4,364,114

[45] Dec. 14, 1982

[54] METHOD AND APPARATUS FOR DETERMINING THE ACOUSTIC VELOCITY OF A WORKPIECE

[75] Inventors: Peter Renzel, Düren; Klaus Kroesen, Bonn, both of Fed. Rep. of Germany

[73] Assignee: Krautkrämer-Branson Incorporated, Stratford, Conn.

[21] Appl. No.: 205,302

[22] Filed: Nov. 10, 1980

[30] Foreign Application Priority Data

Mar. 13, 1980 [DE] Fed. Rep. of Germany ....... 3009574

[51] Int. Cl.³ ............................................. G01N 29/00
[52] U.S. Cl. .................................. 364/565; 73/597
[58] Field of Search ...................... 364/506, 565, 569; 73/587, 597, 901, 629; 367/87, 89

[56] References Cited

U.S. PATENT DOCUMENTS

| | | | |
|---|---|---|---|
| 3,690,155 | 9/1972 | Eichler | 73/597 |
| 3,746,121 | 7/1973 | Niklas | 73/597 |
| 3,848,460 | 11/1974 | Bantz et al. | 73/597 |
| 3,994,154 | 11/1976 | Niklas et al. | 73/597 |
| 4,003,244 | 1/1977 | O'Brien et al. | 73/597 |
| 4,114,455 | 9/1978 | Walker | 73/597 |
| 4,200,921 | 4/1980 | Buckley | 367/87 |
| 4,307,611 | 12/1981 | Opara | 73/597 |

OTHER PUBLICATIONS

Schmidt et al., "Elektronische Laufzeitmessung bei Ultraschalluntersuchungen mit Hilfe des sowjetischen Zählfrequenzmessers 43-34", Feingerätetechnik, Aug. 1975.

*Primary Examiner*—Errol A. Krass
*Attorney, Agent, or Firm*—Ervin B. Steinberg; Philip J. Feig

[57] ABSTRACT

A method and apparatus for determining by the pulse-echo method the acoustic velocity of a workpiece of known thickness utilize measurement of the transit time of the first rear wall echo signal and that of the second rear wall echo signal. The two transit times are then processed in a microprocessor which also controls the entire measuring cycle. For accurate measurement the transit time is defined as the time interval from the leading edge of the trigger pulse, which triggers the transmit pulse generator, to the time at which the respective echo signal exceeds a preset threshold amplitude.

5 Claims, 9 Drawing Figures

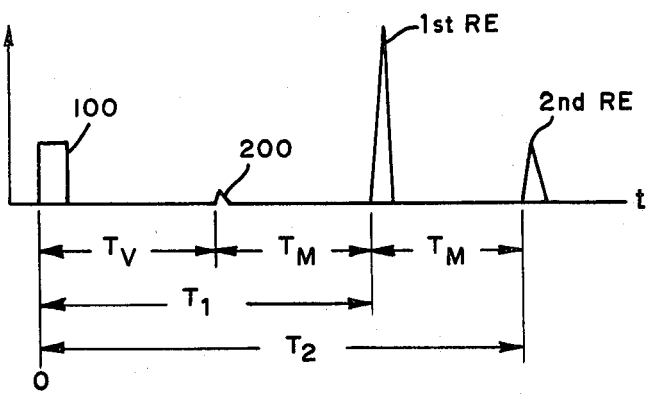
FIG. 1
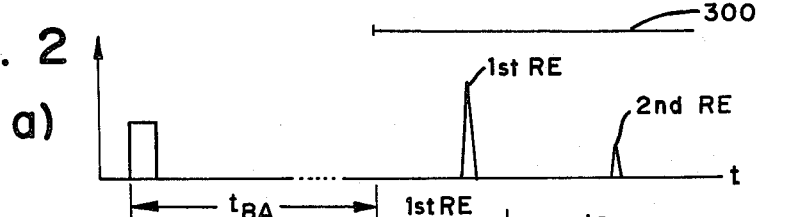
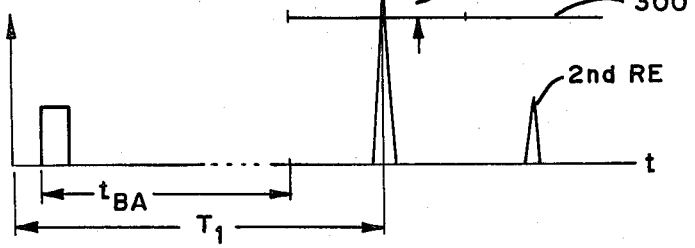
FIG. 2
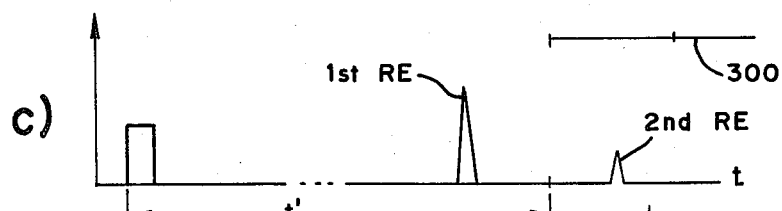
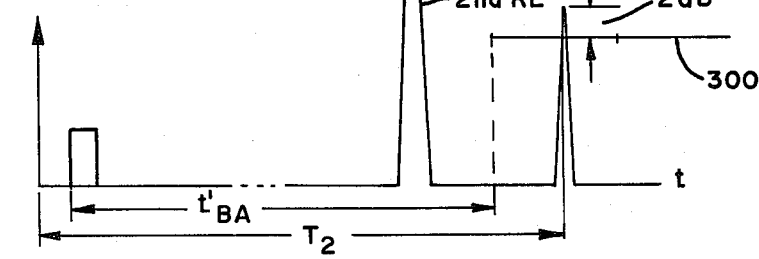

METHOD AND APPARATUS FOR DETERMINING THE ACOUSTIC VELOCITY OF A WORKPIECE

SUMMARY OF THE INVENTION

The instant invention relates to a method and apparatus for determining the acoustic velocity of a material of known thickness by measuring the transit time of the first and of the second rear wall responsive echo signal in the material by means of a portable pulse-echo ultrasonic test instrument. The instrument includes, aside from gate circuit means for setting a time interval during which an echo signal to be measured is registered, also a threshold circuit for evaluating the amplitude of the echo signals.

Methods for measuring acoustic velocities by the use of portable ultrasonic test instruments are known. The known methods use either the immersion test method, see for instance U.S. Pat. Nos. 3,746,121 issued to L. Niklas dated July 17, 1973 and 3,848,460 issued to W. Bantz et al. dated Nov. 17, 1974, or require relatively complicated calibration procedures.

Moreover, changes in the delay path of the transducer probe are generally considered only in part, thus, when using older test probes, the acoustic velocities measured are subject to error. If changes of the delay path of a particular transducer probe are compensated by a corresponding calibration procedure, the operator is not provided with data relating to the actual change of the delay path.

A principal object of the present invention is therefore the provision of a method and apparatus for determining the acoustic velocity of a workpiece of known thickness while providing simultaneously data concerning the delay path present in the test probe.

A most significant advantage of the present invention resides in the fact that the individual steps necessary are accomplished in a simple manner, fully automatically, by means of a microprocessor.

Other important features and advantages of the invention will be more clearly apparent from the following description when taken in conjunction with the accompanying drawings.

BRIEF DESCRIPTION OF THE DRAWINGS

FIG. 1 is a schematic diagram showing the echo signals from a defect-free workpiece;

FIGS. 2a through 2d are schematic diagrams similar to FIG. 1 for illustrating the present invention;

DETAILED DESCRIPTION OF THE INVENTION

Figure 3:
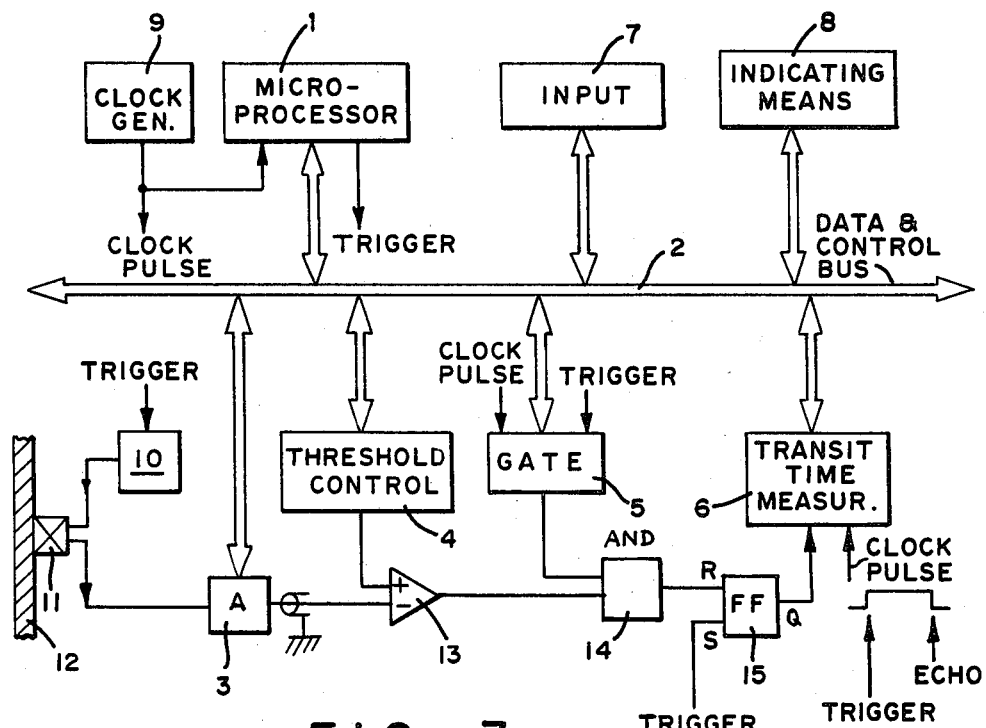
FIG. 3 is a schematic block diagram of an embodiment of the present invention.

Referring now to the figures and FIG. 1 in particular, the trigger signal causing operation of the standard transmitter is designated with numeral 100, the interface echo signal with numeral 200, and the echo signal arising from the transmit or search signal intercepting the workpiece rear wall is designated with RE. The transmit pulse disposed between the trigger signal and the interface echo signal is not shown as it is of no significance in connection with the present invention. Time reference is established with respect to the leading edge of the trigger signal.

The signal transit times, more accurately the double transit times of the acoustic signals, in the transducer probe delay path and in the workpiece (material) are designated $T_V$ and $T_M$ respectively. As is apparent from FIG. 1, the following relations apply:

$$T_M = T_2 - T_1 \tag{1}$$

$$T_V = T_1 - T_M = 2T_1 - T_2 \tag{2}$$

Assigning to the acoustic velocity of the workpiece the designation $C_M$, then equation (1) becomes:

$$C_M = 2 \cdot S_{MAT}/T_M = 2 \cdot S_{MAT}/T_2 - T_1 \tag{3}$$

and for the delay path in the transducer probe $S_V$ using equation (2):

$$S_V = \tfrac{1}{2} \cdot T_V \cdot C_V = \tfrac{1}{2}(2T_1 - T_2) \cdot C_V \tag{4}$$

whereby $S_{MAT}$ the thickness of the workpiece and $C_V$ the acoustic velocity of the delay path of the probe are assumed to be known.

FIGS. 2a to 2d disclose how the important time intervals $T_1$ and $T_2$ necessary for solving equations (3) and (4) are determined in order provide automatic measurement of the values noted heretofore. As seen in FIG. 2a, initially the threshold value 300 is adjusted to a fixed reference level, e.g. eighty percent of the screen height, if an instrument with a cathode ray display is used. Amplification of the instrument is set to its minimum value (zero db). Thereafter, the time gate is adjusted to cause the first rear wall echo signal (1st RE) to appear in the gate as the first echo signal. Preferably, this is accomplished by adjusting the gate start $t_{BA}$ to cause $t_{BA} = (2/C_o)S_{MAT}$. The value $C_o$ is an arbitrarily selected acoustic velocity which, however, must be greater than the acoustic velocity $C_M$ to be measured. Hence, for the condition $C_o > C_M$ the gate start lies certainly before the first rear wall echo signal.

The gate width $t_{BB}$ is selected to cause the following condition to be satisfied:

$$(t_{BA}/t_{BB}) \cdot C_o \leq C_M < C_o$$

Hence, if value $t_{BB}$ is selected to be ten times $t_{BA}$ the first rear wall echo signal lies certainly within the gate.

After the gate setting has been made the amplification is increased until the peak value of the first rear wall echo coincides with the gate threshold amplitude. In order to assure coincidence, the amplification is increased, preferably by 2 db. Thereafter, the time value $T_1$ is measured by means of the transit time measuring circuit and the value obtained is stored.

The new gate start value $t'_{BA}$ for the second rear wall echo signal is adjusted for the value:

$$t'_{BA} = T_1 + t_{BA}$$

This setting assures that the gate is open for a period of time after the occurrence of the first rear wall echo signal and certainly prior to the occurrence of the second rear wall echo signal, see FIG. 2c. The width of the gate $t_{BB}$, once again is:

$t_{BB} = 10 \cdot t_{BA}$

After adjusting the gate so that it encompasses the second rear wall echo signal, then, as described hereinabove in conjunction with the first rear wall echo signal, the threshold level of the gate is brought to coincidence with the second rear wall echo signal and subsequently the transit time value $T_2$ is measured and stored.

By means of computing means using the equations (3) and (4) the acoustic velocity $C_M$ and the length of the transducer probe delay path are determined using the values $T_1$, $T_2$, $S_M$ and $C_V$.

FIG. 3 is a preferred embodiment of an apparatus for accomplishing the above steps. A microprocessor 1 (type Z80 for instance) is coupled by an 8-line control bus and an 8-line data bus to a programmable amplifier 3, to a threshold value control, to a gate circuit 5, to a transit time measuring circuit 6, to input means 7, and to indicating or display means 8. A clock 9 generates the required synchronizing pulses. Trigger pulse 100 which, among other things, triggers the transmitter 10 and the gate circuit 5 is produced by the microprocessor 1.

Transmitter 10, responsive to the receipt of a trigger pulse, generates a transmit signal which is applied to the transducer probe 11 which, in turn, transmits an acoustic search signal into the workpiece 12. As the search signal intercepts the rear wall of the workpiece 12, a first rear wall echo signal is generated which is reflected to the probe 11. The echo responsive electrical signal derived from the probe 11 is then conducted via a programmable amplifier 3 to a comparator 13 where the signal is compared with a predetermined threshold value from threshold control 4.

The output of the comparator 13 is coupled to one of the two inputs of an AND gate 14. The other input of the gate 14 receives a gate signal from the gate circuit 5. Therefore, the output of the AND gate 14 provides only such ultrasonic echo signals which have an amplitude that is greater than the predetermined threshold amplitude and which timewise occur within the time interval defined by the open gate condition.

The output of the AND gate 14 is coupled to a flip flop 15 which is set by the trigger signal at input S and which is reset at input R by the echo responsive signal from AND gate 14. The output terminal Q of the flip flop 15, therefore, provides a pulse signal whose width corresponds to the time interval between the leading edge of the trigger signal and the coincidence between the rear wall echo signal and the gate threshold amplitude. This pulse width is then measured by the transit time measuring circuit 6.

Figure 4:
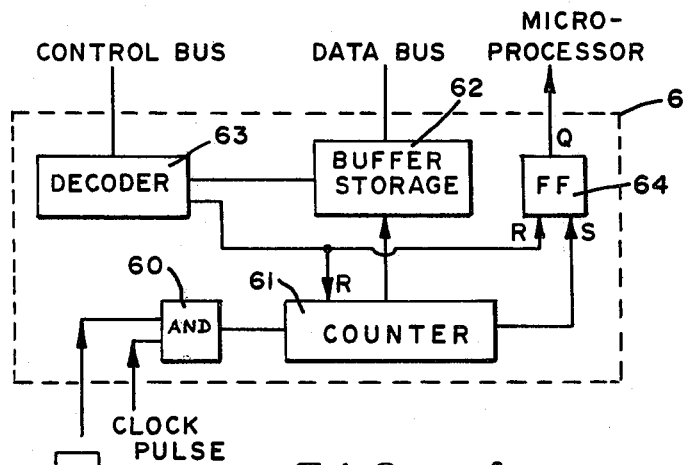
FIG. 4 is a schematic block diagram of the acoustic velocity measuring arrangement as used in connection with the embodiment per FIG. 3.

With reference to FIG. 4, the width of the output signal from flip flop 15 is counted by means of clock pulses from clock 9 and an AND gate 60, and the resultant counts are accumulated in the counter 61. The digital count value corresponding to the transit time is provided from the counter 61 via one of the outputs to the buffer storage 62 for storage therein. This stored value can be called up by the microprocessor 1 by means of decoder 63, see also FIG. 3, since the microprocessor is coupled via the control bus to the decoder 63 and is coupled via the data bus to the buffer storage 62. The digital transit time values are transformed to corresponding acoustic velocity values, or probe delay path length values respectively, by means of calculations within the microprocessor 1 using the equations (3) and (4). Such values are then displayed by the display means 8.

The above embodiment makes use of a counter 61 with 16 bits so that 16 lines are coupled to the buffer storage. Since the data bus has only 8 lines, the stored information must be transmitted to the microprocessor sequentially in the form of two 8-bit words.

Decoder 63 causes the counter 61 and the flip flop 64 coupled to the transfer output of the counter 61 to be reset prior to its measuring cycle. Flip flop 64 responsive to overflow of the counter 61 provides a control signal for advising the microprocessor that the result from the measurement just derived is invalid (no coincidence).

Figure 5:
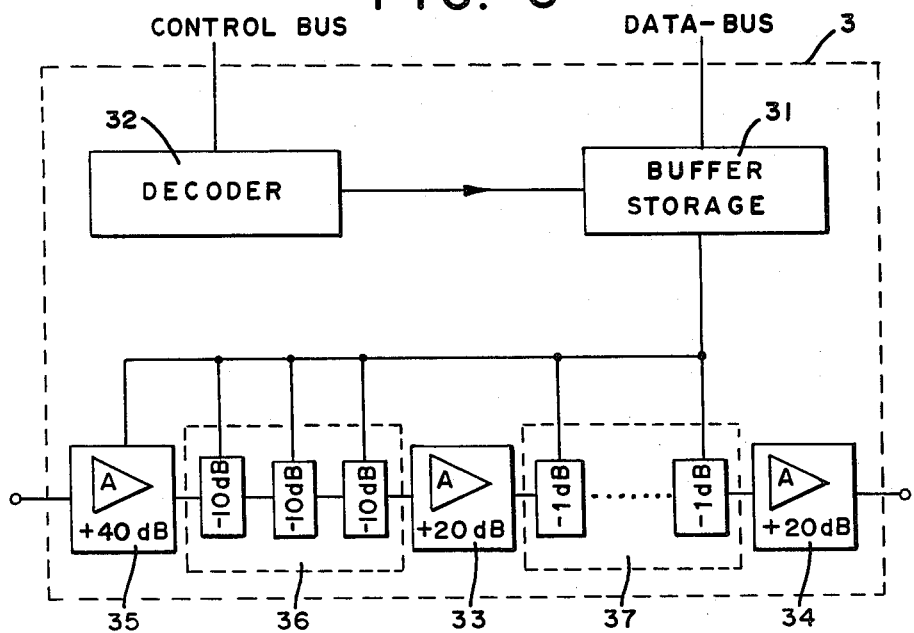
FIG. 5 is a schematic block diagram of the programmable amplifier used in FIG. 3.

FIG. 5 depicts a programmable amplifying means found most suitable for the present invention. The amplifying means comprises two amplifiers 33 and 34 with fixed amplification factor (20 db), an adjustable preamplifier 35 with amplification factor 0 or 40 db, and attenuating means 36 having three steps of $-10$ db each, and attenuating means 37 having nine steps of $-1$ db each. The steppable attenuating means associated with the amplifying means 36 and 37 and the preamplifier 35 can be switched singly or in parallel in circuit by the use of a suitable switching means, not shown. Each electronic switch is controllable via a control conductor which is coupled to the buffer storage 31. The condition of each switch is stored in the buffer storage in the form of bit values which are given by the microprocessor 1, FIG. 3. Since in the present embodiment a data bus comprising 8 lines is used, two sequentially occurring 8-bit bytes must be read-in and decoded. Read-in and cancelling of stored values is done via the decoder 32.

Figure 6:
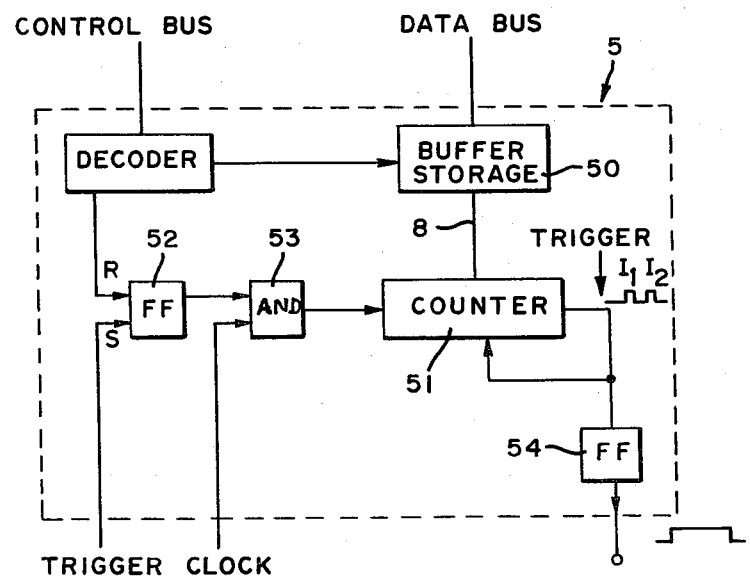
FIG. 6 is a schematic block diagram of a programmable gate circuit also used in FIG. 3.

Whereas the threshold circuit 4 essentially comprises merely a D/A converter which converts the digital threshold signals provided by the microprocessor 1 to analog voltage signals and, therefore, is not illustrated, FIG. 6 is a schematic block diagram of the gate circuit 5, FIG. 3. The gate start signal produced by the microprocessor 1 is transferred via the buffer storage 50 to a counter 51. Following this, the gate width value is stored in the buffer storage 50 and is ready for acceptance by the binary counter 51. If a new trigger signal is applied to flip flop 52, the flip flop is set and clock pulses are applied via the AND gate 53 to the count input of the counter 51. The count accumulated in the counter 51 is counted off by the count frequency of the clock 9, FIG. 3. After the counting off of the gate start value, a first pulse signal $I_1$ is produced at the output of the counter, which signal sets the JK flip flop 54. The pulse signal $I_1$ simultaneously is applied to the load inputs of the counter 51 and renders the counter 51 ready for operation, thereby causing the gate width value to be transferred immediately into the counter 51 and counted off. After counting off the gate width value, a pulse signal $I_2$ is produced at the output of the counter, which signal resets the JK flip flop.

SUMMARY OF OPERATION

The measuring cycle is carried out as follows

Initially, the microprocessor calculates from the workpiece thickness $S_{MAT}$ supplied the values for the gate start and gate width by setting the gate start $t_{BA}$ equal to $2/C_o \cdot S_{MAT}$ and the gate width to $10 \cdot t_{BA}$ as described hereinabove. The initially set value for $C_o$ can, for example, for all measuring conditions occurring in practice be set to 9999 m/sec.

Thereafter the amplifying means 3 is set to minimum amplification, the trigger pulse released and the ultrasonic echo is investigated for coincidence, that is compared with the preset gate thresold value. If the amplitude of the ultrasonic echo signal (1st RE) does not exceed the amplitude of the gate threshold (absence of coincidence) the amplifying means is incremented by 1 db and the trigger operated once again. This procedure is repeated until coincidence is achieved. Thereafter, the amplification is increased by 2 db and the value $T_1$ is measured and stored.

The microprocessor then provides the new gate values for the second rear wall echo signal, causes the amplifying means to be set to zero db, incrementally increases the amplification provided by the amplifying means until coincidence is attained, calculates the transit time value $T_2$ and calculates the desired acoustic velocity value $C_M$ and the delay path length in the transducer probe. Since the calculation of the delay path length $S_V$ is a function of the transit time measurement $T_1$ which has been measured at 2 db below the amplitude value of the first rear wall echo, the resultant value of $S_V$ is somewhat too large (edge error). This error can be corrected if an additional transit time measurement $T_1'$ is carried out wherein the point of coincidence lies on the leading edge of the first rear wall echo signal at about 20 to 40 percent of the height of the cathode ray tube screen, assuming that the 2 db threshold value corresponds to a CRT screen height of about 80 percent. This procedure is possible only in the case of an instrument having a cathode ray tube. The value $S_V$ is calculated then from equation (4) when substituting for the value $T_1$ the value $T_1'$.

In order to ascertain whether the time interval between the correct echo signals has been measured, it has been found advantageous to set the gate bar corresponding to the known value $S_{MAT}$, assuming that test instruments having a cathode ray tube screen are used. Upon consideration of the prior determined values for $T_1$ or $T_1'$ and $T_2$ the gate bar must appear then between the first and the second rear wall echo signals on the CRT screen.

For a detailed explanation of multiple echoes as caused by consecutive front and rear wall signal relfections in a workpiece, see Ultrasonic Testing of Materials (book) J. & H. Krautkrämer, Springer Verlag, New York, N.Y. (1977) page 196.

While there has been described and illustrated a preferred embodiment of the present invention, it will be apparent to those skilled in the art that various changes and modifications may be made therein without deviating from the scope of the invention which shall be limited only by the scope of the appended claims.

What is claimed is:

1. The method for determining the acoustic velocity of a workpiece of known thickness by measuring the transit time of a first and of a second rear wall echo signal by utilizing an ultrasonic test instrument which includes an ultrasonic transmitter for providing an ultrasonic search pulse, a receiver circuit having adjustable amplifying means for processing received echo signals, an adjustable gate circuit for providing a gated time interval during which an echo signal is registered by said receiver circuit, and a threshold voltage means for evaluating the amplitude of an echo signal registered during said gated time interval, the steps comprising:

providing a trigger pulse to said ultrasonic transmitter which responsive to the receipt of said trigger pulse produces an electrical transmit pulse;

applying said transmit pulse to a transducer probe coupled to a workpiece for causing an ultrasonic search signal to be transmitted into the workpiece responsive to said transmit pulse, and said probe subsequently receiving consecutive echo signals arising from said search pulse intercepting the rear wall of said workpiece and then being reflected sequentially at the front wall and rear wall of the workpiece;

providing echo responsive electrical signals from said probe to said receiver circuit and adjusting said gate circuit to cause the first rear wall echo responsive signal following said transmit pulse to be registered within a gated time interval be setting the start of said gate circuit in accordance with $t_{BA} = S_{MAT}/C_o$;

setting said amplifying means to a predetermined reference gain level and changing such setting to cause the amplitude of said first rear wall echo responsive signal to exceed within said gated interval a predetermined threshold amplitude of said threshold voltage means;

measuring the time interval between the start of the trigger pulse and the time at which said first rear wall responsive echo signal exceeds said predetermined threshold amplitude and storing such time interval value;

setting said amplifying means to said predetermined reference gain level;

adjusting said gate circuit to cause the second rear wall echo responsive signal to be registered within a gated time interval by setting the start of the gate circuit in accordance with $t'_{BA} = t_{BA} + T_1$;

changing the setting of said amplifying means to cause the amplitude of said second rear wall echo responsive signal to exceed said predetermined threshold amplitude of said threshold means;

measuring the time interval between the start of the trigger pulse and the time at which said second rear wall echo responsive signal exceeds said predetermined threshold amplitude, and calculating the acoustic velocity of the workpiece from the respective time interval values using the formula:

$$C_M = (2 \cdot S_{MAT})/(T_2 - T_1)$$

wherein $C_M$ is the acoustic velocity of the workpiece, $S_{MAT}$ is the known thickness of the workpiece, $T_2$ is the time interval value pertaining to the second rear wall echo responsive signal, $T_1$ is the time interval value pertaining to the first rear wall echo responsive signal, $t_{BA}$ is the start of the gated time interval for the first rear wall echo responsive signal measured from the start of the trigger pulse, $C_o$ is an arbitrarily selected acoustic velocity value greater than the velocity to be determined, and $t'_{BA}$ is the start of the gated time interval for the second rear wall echo responsive signal measured from the start of the trigger pulse.

2. The method for determining the acoustic velocity as set forth in claim 1, and setting the gate circuit to cause the gated time interval to have a width of approximately $10 \cdot t_{BA}$.

3. The method for determining the acoustic velocity as set forth in claim 1, and selecting the velocity $C_o$ to the maximum value provided by the test instrument.

4. Apparatus for determining the acoustic velocity ($C_M$) of a workpiece of known thickness ($S_{MAT}$) by measuring the transit time of a first and of a second rear wall echo signal utilizing an ultrasonic pulse-echo test instrument comprising:

trigger means for providing a trigger pulse;

pulse generating means coupled for receiving said trigger pulse and in response to the receipt of said trigger pulse providing an ultrasonic transmit pulse;

a transducer probe adapted to be coupled to a workpiece of known thickness and in response to the receipt of said transmit pulse sending an ultrasonic search signal into the entrant surface of the workpiece and thereafter receiving echo responsive signals from the rear wall and entrant surface and providing corresponding echo responsive electrical signals;

receiving means coupled to said probe and including signal amplifying means, gate means and threshold means for receiving said echo responsive signals;

said gate means including control means for providing a first gated time interval during which the first rear wall echo responsive signal from the workpiece is registered and similarly for providing a second gated time interval during which the second rear wall echo responsive signal from the workpiece is registered;

said amplifying means including control means for adjusting said amplifying means until said first rear wall echo responsive signal and said second rear wall echo responsive signal received during the respective gated time intervals exceed a predetermined threshold amplitude of said threshold means;

measuring means coupled to said trigger means and said threshold means for measuring the time interval ($T_1$) from the start of said trigger pulse to the time at which said first rear wall echo responsive signal exceeds said predetermined threshold and the time interval ($T_2$) from the start of said trigger pulse to the time at which said second rear wall echo responsive signal exceeds said predetermined threshold, and microprocessor means for controlling said trigger means, said gate control means, said amplifying means, said threshold means, said measuring means and display means for determining the acoustic velocity of the workpiece by solving the equation $$C_M = (2 \cdot S_{MAT})/(T_2 - T_1)$$

and causing the acoustic velocity to be displayed by said display means.

5. Apparatus for determining the acoustic velocity of a workpiece as set forth in claim 4, said control means of said amplifying means operating upon adjustable attenuating means coupled in circuit with said amplifying means, and buffer storage means coupled to said measuring means for temporarily storing said time interval value ($T_1$) relating to said first rear wall echo responsive signal and then providing said stored value to said microprocessor means responsive to a control signal from said microprocessor means.

* * * * *